United States Patent

Kamo et al.

[11] Patent Number: 5,084,789
[45] Date of Patent: Jan. 28, 1992

[54] "PARALLEL TRANSFER TYPE DISK SYSTEM"

[75] Inventors: Yoshihisa Kamo, Musashimurayama; Hitoshi Kakuta, Kokubunji, both of Japan

[73] Assignee: Hitachi, Ltd., Tokyo, Japan

[21] Appl. No.: 585,988

[22] Filed: Sep. 21, 1990

Related U.S. Application Data

[63] Continuation-in-part of Ser. No. 343,290, Apr. 26, 1989.

[30] Foreign Application Priority Data

Sep. 25, 1989 [JP] Japan ................. 1-246398

[51] Int. Cl.$^5$ ............................................. G11B 5/09
[52] U.S. Cl. ............................. 360/53; 360/39
[58] Field of Search ............................ 360/39, 53

[56] References Cited

U.S. PATENT DOCUMENTS 4,498,146 2/1985 Martinez ........................ 364/900
4,706,136 11/1987 Wentzel et al. .................. 360/53

Primary Examiner—Vincent P. Canney
Attorney, Agent, or Firm—Antonelli, Terry, Stout & Kraus

[57] ABSTRACT

A parallel transfer type disk system comprising: a means for parallel dividing input digital data; a plurality of magnetic disks for recording each of said divided digital data, said magnetic disks including a plurality of magnetic heads for allocating said divided digital data to a plurality of tracks on a plurality of magnetic recording disks for simultaneous recording of the data, and a magnetic head driving means including a head selection means for driving said magnetic heads; a means for detecting defective track among said plurality of tracks from each of track signals; and a means for temporarily recording digital data allocated to a defective track and then recording the data on a predetermined track, or for simultaneously recording digital data allocated to said defective track and digital data allocated to tracks other than said defective track on a predetermined group of replacement tracks on said plurality of recording media, when existence of said defective track has been detected by said detecting means among a group of tracks on which said parallel divided digital data are to be recorded.

14 Claims, 5 Drawing Sheets

F I G. 4
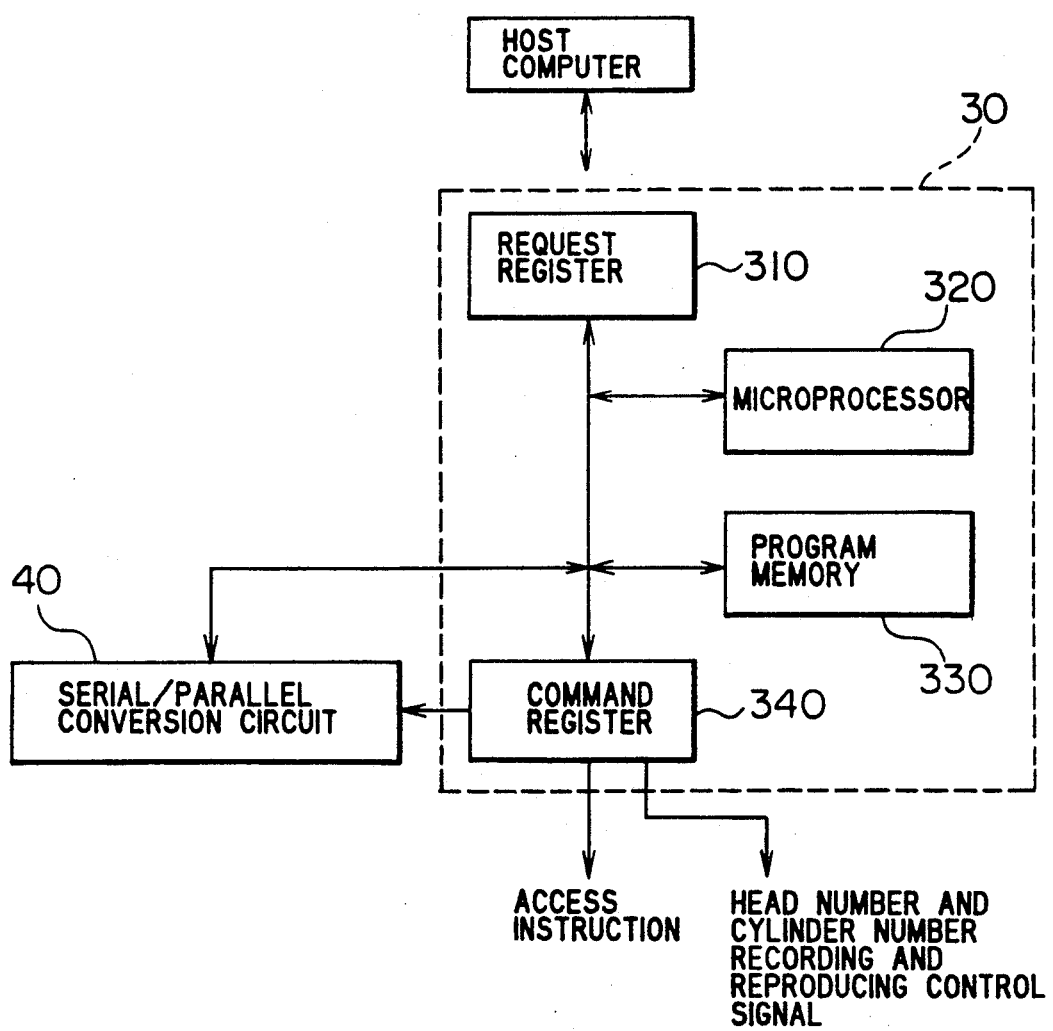

"PARALLEL TRANSFER TYPE DISK SYSTEM"

This is a continuation-in-part of our U.S. patent application Ser. No. 343290, filed on Apr. 26, 1989, the disclosure of which is hereby incorporated by reference.

BACKGROUND OF THE INVENTION

The present invention relates to a file unit for a magnetic disk unit, an optical disk unit, etc., and more particularly, to a parallel transfer type (or a multi-channel type) disk unit for simultaneously recording and reproducing with heads mounted on a plurality of driving units.

Usually, a plurality of magnetic heads 520, 521, 522 and 523 are mounted on one driving unit (a head transfer mechanism) 510 in a magnetic disk unit, and one of these magnetic heads is selected to record on and reproduce from a disk 530, as shown in FIG. 1. On the other hand, parallel transfer type magnetic disk units have been proposed for recording and reproducing information on and from tracks by parallel splitting of the information, after it is converted from serial data to parallel data, onto parts of about one bit or one byte, and by simultaneously operating recordable and reproducable magnetic heads as pairs without operating a transfer mechanism (such as heads 520 and 521 of which state is described in Japanese Patent Unexamined Publication No. JP-A-54-39611, and heads 521, 522, 523, . . . , of which state is described in Japanese Patent Unexamined Publication No. JP-A-61-145767). 511 designates a head driving voice coil motor and 512 designates a carriage.

A parallel transfer type file system is disclosed in the Mini-Micro systems, December 1987 edition, pp. 15–16. This system takes a rotation synchronization between a plurality of disk units to parallel transfer data.

The above-described techniques aim at obtaining a high data transfer speed by dividing a data recording at one position and simultaneously recording and reproducing the data.

In a magnetic disk unit, a magnetic disk is inspected when the unit is shipped. A track having many large defects is judged to be incapable of recording or reproducing data, and is registered initially as a defective track. Registration of a defective track is recorded in a home address section 635 which immediately follows an index marker 634 of each track in the track format shown in FIG. 2. Use of a defective track is inhibited and another track is designated as an alternate track. A position of the alternate track is indicated by a record $R_0$ 636 of a 0-th position following the home address section. A record 1 (637) to a record n is an area which a user can use, where n changes depending on a record length of a user data.

A structure of the above format is described, for example, in the IBM JOURNAL OF RESEARCH AND DEVELOPMENT, November 1974 edition, pp. 489–505.

A specific position near the inner most periphery is usually a convenient position for the above-described indicated alternate track. According to the conventional unit, when there is a defective track in a group of tracks which are transferred in parallel and when a replacement track is indicated, a group of good tracks are recorded first and then a head is repositioned to the alternate track and data is sent again from the computer and recorded on the replacement track. At the time of reproduction, the original track (a good track) is reproduced and then the replacement track is newly reproduced and data is sent to a controller a plurality of times (for the good track and the replacement track). This means that it takes twice the number of moves of a head between the defective track and the alternate track for the data transfer. Therefore, the total throughput of the file system is reduced by the conventional method.

SUMMARY OF THE INVENTION

The present invention relates to a parallel transfer type disk unit and provides a system which can record and reproduce at a high speed even if there is a bad track in a disk.

It is an object of the present invention to provide a parallel transfer type disk system which enables parallel transfer without reducing throughput of the file system even if there is a defective track as described above.

The above object is achieved by a parallel transfer type disk system which comprises a data input means, a means for dividing the above data in parallel, a plurality of heads for allocating the divided data to a plurality of tracks on a plurality of recording media and for simultaneosuly recording the data, a plurality of driving units for independently moving at least one of said heads on said recording media, a means for detecting a defective track among said plurality of tracks, a memory means for recording data allocated to said defective track when said defective track exists among a track group on which said parallel divided data is to be recorded, and a means for recording data allocated to tracks other than said defective track and for simultaneously recording data allocated to said defective track in said memory means.

The present invention is characterized in that the parallel transfer type disk system includes a plurality of driving units for driving (moving) heads, and therefore, there are two cases, that is, a case where a plurality of head disk assemblies (HDA) each including one driving unit are provided and a case where a plurality of driving units are provided in one or a plurality of head disk assemblies.

As a memory means for recording digital data allocated to said defective track, a replacement track on said recording media or a buffer memory provided separately from the recording media may be used, but the application is not limited to these.

On such a recording means as described above, data allocated to a defective track is recorded, and at the same time, data allocated to tracks other than said defective track within said plurality of tracks are recorded. These data are recorded in a buffer memory, on tracks other than a defective track within said plurality of tracks and on a specific alternate track on said recording media, depending on the case, but recording media are not limited to these.

As described above, according to the present invention, a buffer memory or a track for recording data instead of a defective track and a good track (or a buffer memory or a track instead of a good track for recording data) are structured to be capable of simultaneously (parallel) recording and reproducing, so that data can be recorded and reproduced in one data transfer operation even if a defective track exists in a plurality of tracks to which data is transferred in parallel. Therefore, only one data transfer operation is sufficient when a defective track exists in a track group to which data is to be transferred, thus enabling a high-speed recording and reproducing operation.

According to the present invention, parallel transfer of data between different dividing units becomes possible by one data transfer operation from the host computer, so that the computer system can be utilized efficiently. Further, an access to an alternate track for a defective track at a parallel transfer time is facilitated so that a disk having many defective tracks of relatively low quality can be used.

BRIEF DESCRIPTION OF THE DRAWINGS

FIG. 4 is a block diagram showing a detailed configuration of a control circuit shown in FIG. 3;

DESCRIPTION OF THE PREFERRED EMBODIMENTS

First, description will be made of a case where a buffer memory is provided within a system or within a controller, as a means for storing digital data allocated to a defective track. A maximum size of a buffer memory may be (capacity per one track)×((total number of tracks for parallel reading and writing)−1). It is desirable that a buffer memory to be used has non-volatility or a means for having non-volatility, such as an IC memory having a battery back-up, for example, from the viewpoint of securing reliability of the buffer memory.

The buffer memory temporarily stores data to be recorded on an alternate track at the time of recording and data of good tracks at the time of reproduction.

Figure 1:
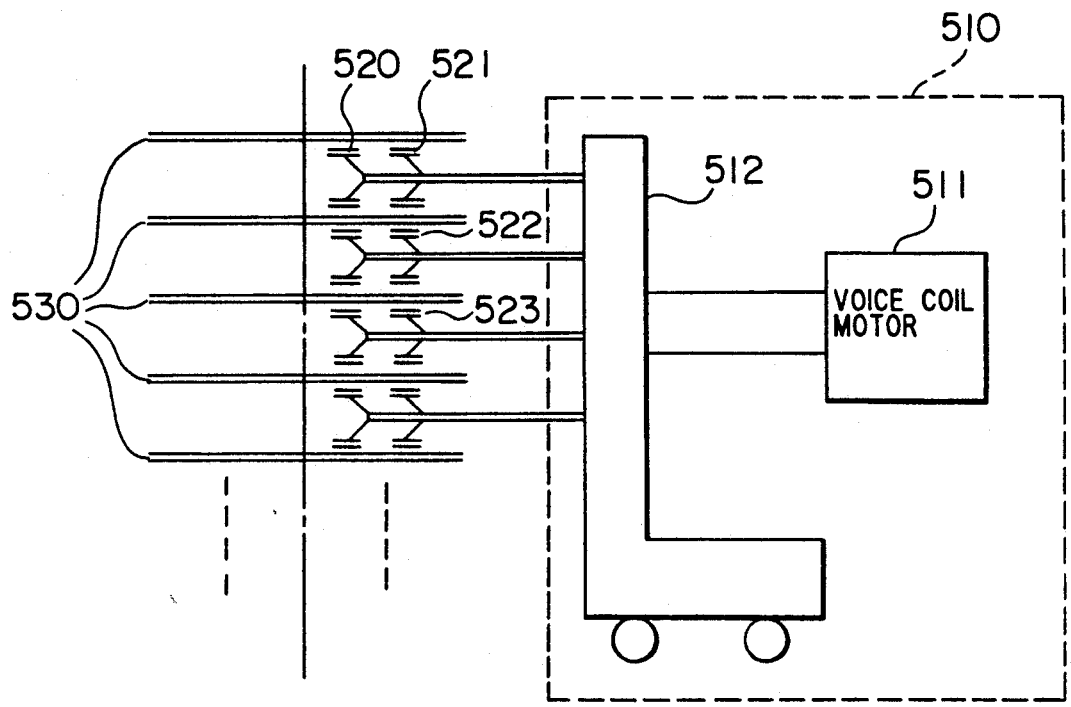
FIG. 1 is a diagram showing an outline of an internal structure of a conventional magnetic disk unit.
Figure 2:
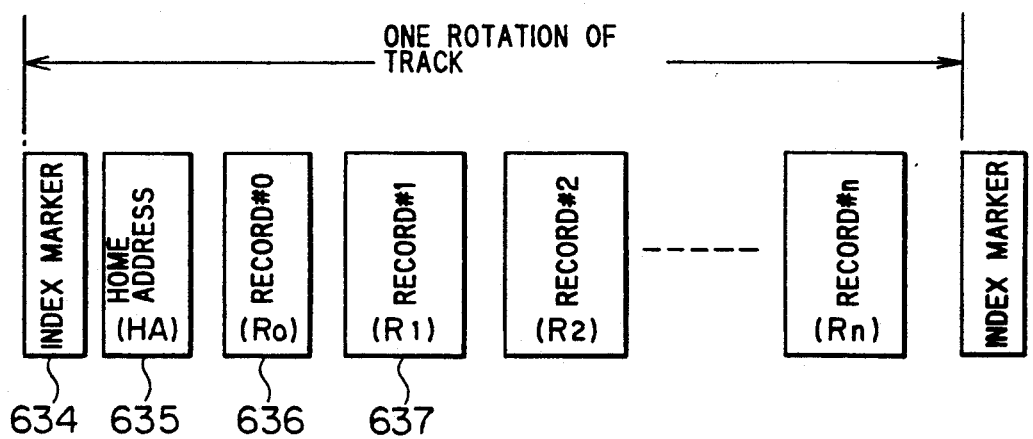
FIG. 2 is a diagram showing a format of a track signal in the magnetic disk unit.
Figure 3:
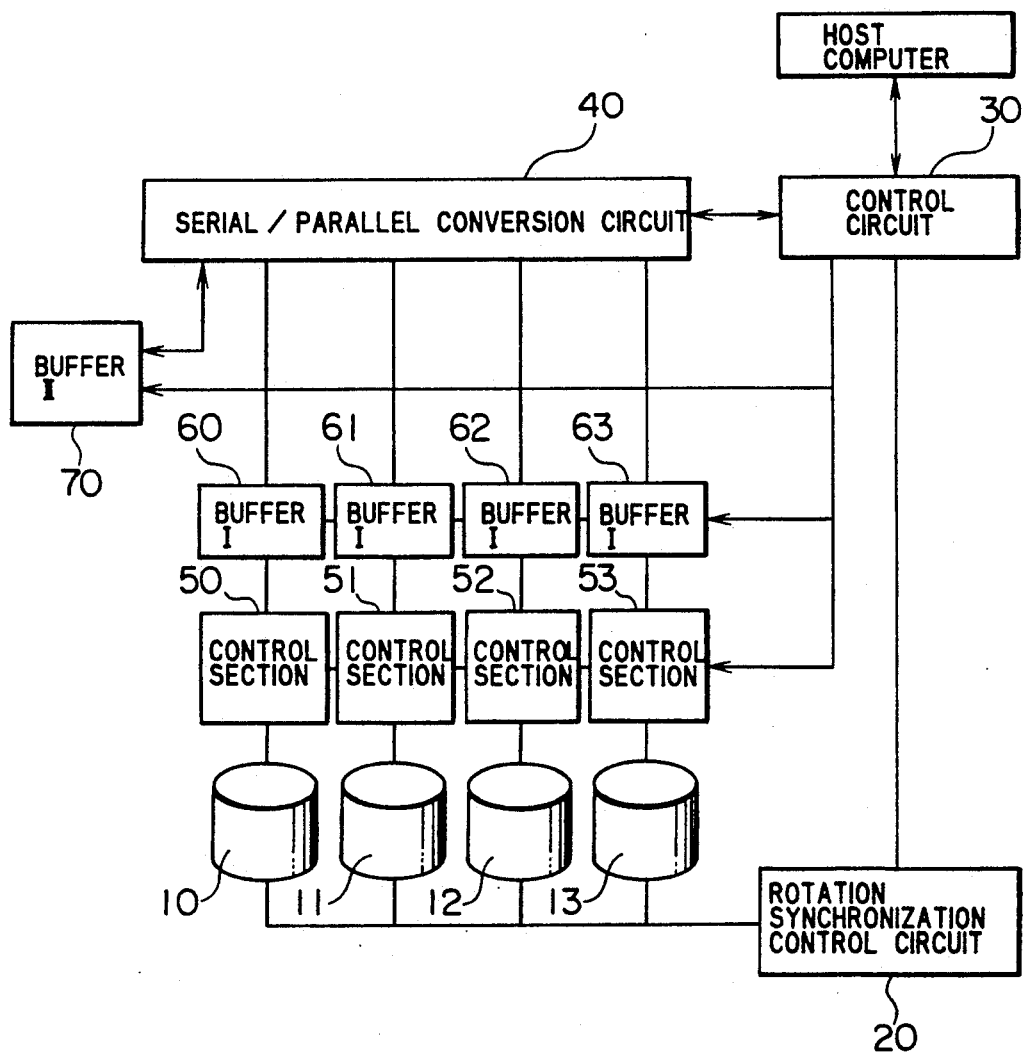
FIG. 3 is a diagram showing an outline configuration of a parallel transfer type disk system as one embodiment of the present invention.
Figure 7:
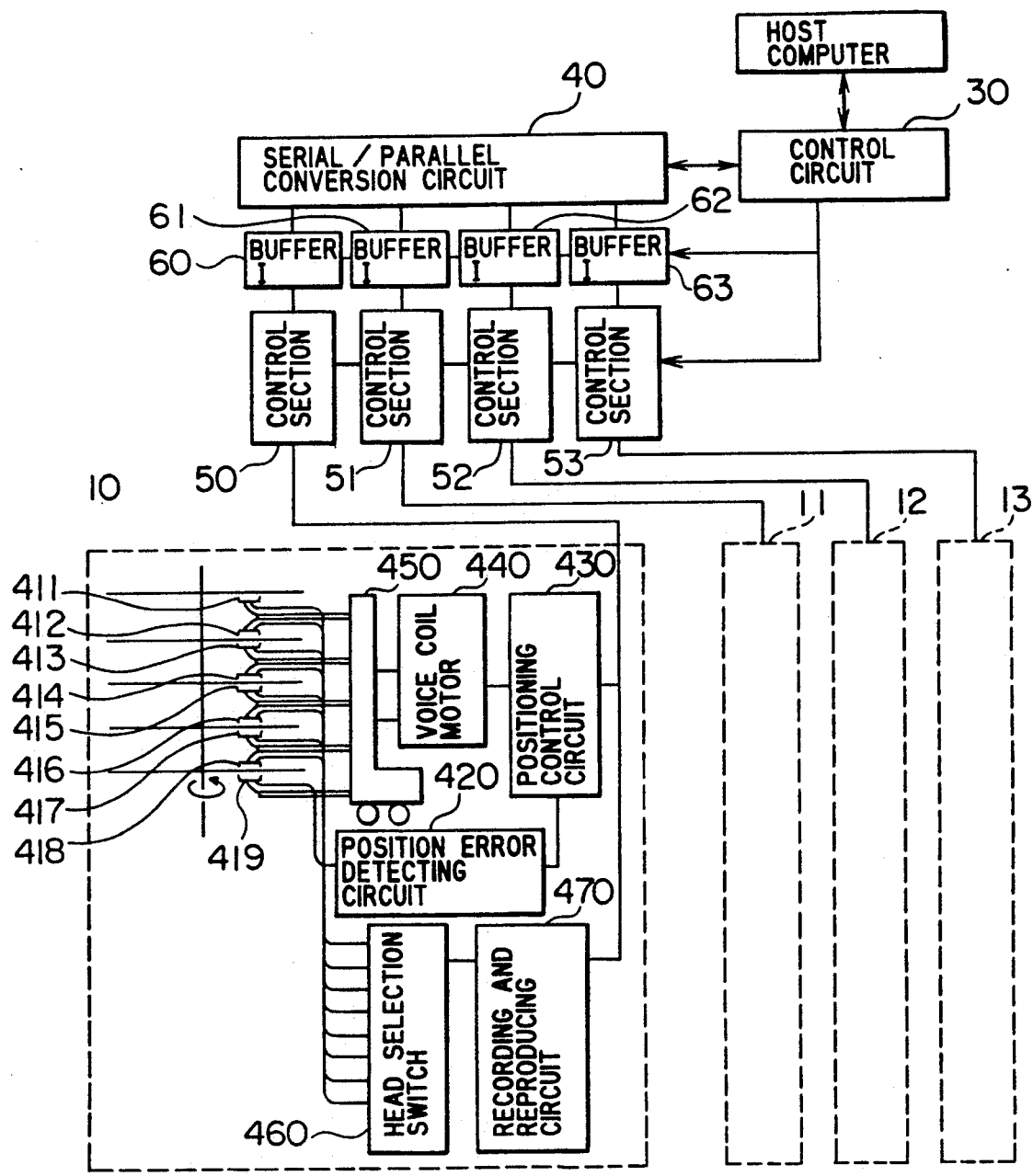
FIG. 7 is a diagram showing an outline configuration of a parallel transfer type disk system as a further embodiment of the present invention.

Description will be made in detail with reference to FIG. 3. The file system of the present embodiment uses four magnetic disks 10 to 13 which are driven by respective driving units (a head transfer mechanism comprising a servo head 419, a position error detecting circuit 420, a positioning control circuit 430, a voice coil motor 440 as shown in FIG. 7). A time for one rotation to be made between these magnetic disk driving units by a rotation synchronizing control circuit 20 is synchronized to within 16.7 ms±50 μs including the phase of rotation.

Operation of the parallel transfer type disk system will be explained below. Recording and reproducing commands from the host computer and data to be recorded are analyzed by a control circuit 30. The control circuit 30 is structured as shown in FIG. 4 in detail. A command is first stored in a request register 310 and is decoded by a microprocessor 320 in accordance with a microprogram stored in a program memory 330. A resultant command is transferred to a command register 340 in the form of a recording and reproduction control signal, an access command signal, a target cylinder number, a head number, etc. An access command to make access to each of disks 10 to 13 is transferred to control sections 50 to 53 of each disk, and access is made to each disk. When a head comes to a position for recording on and reproducing from a track, data to be recorded is transmitted from the host computer to a serial/parallel conversion circuit 40 through the control circuit 30 at the time of recording, and the data is arbitrarily divided into four units in either a bit unit or a byte unit and is recorded on each of the disks 10 to 13. Buffers I 60 to 63 connected to each of the disks 10 to 13 are used to absorb errors of rotation synchronization between the disks, and a capacity of (capacity per one track)×(about rotation synchronization precision) is sufficient. In the present embodiment, total capacity is set to 300 bytes based on 47.5K bytes for a capacity per one track and $$\frac{\pm 50 \, \mu s}{16.7 \, ms} = \pm 0.3\%$$

for a rotation synchronization precision. At the time of recording, when a track of a certain disk, for example, a disk 11, is defective and an alternate track has been assigned, data to be recorded on the alternate track is first stored in a buffer II 70 and the data is recorded on good tracks only (that is, disks 10, 12 and 13). The disk 11 must start accessing the alternate track again. The access may be started immediately after the alternate track has been recognized or it may be started after data has been recorded on all the good tracks of good disks. It is of course clear that it is more efficient to start accessing immediately after the alternate track has been recognized. When the access to the alternate track has been completed and the head has come to the position for starting recording, data to be recorded on the alternate track is read out from the buffer II, thus completing the recording. If there exist defective tracks in a plurality of disks, data to be recorded on the respective tracks are stored in the buffer II and the data is read out from the buffer II for recording after access to each alternate track of each disk has been completed. At the time of reproducing, if there is no defective track after access to each disk has been completed, data to be reproduced from each disk is sent to the serial/ parallel conversion circuit 40 and is sent to the host computer through the control circuit 30 after the data has been converted to serial data. If there exists a defective track, data to be reproduced from good tracks are first stored in the buffer II 70 and are reproduced after a disk of the defective track has accessed alternate track. This data together with the data once stored in the buffer II 70 are serial/parallel converted and are sent to the host computer as serial data. It has already be described above that the capacity of the buffer II may be generally equal to the capacity per one track $\times(m-1)$ where m represents a number of disks to be parallel transferred. In the present embodiment, the capacity is calculated to be 47.5K bytes $\times(4-1)=142.5$K bytes.

If data is to be recorded on and reproduced from each disk by using a plurality of n heads at the same time, a number of data to be divided becomes m x n, so that the capacity of the buffer II is (capacity per one track)$\times(m-1)\times n$.

As described above, it is possible to realize a file system which can perform parallel transfer even if there is a defective track.

In the present embodiment, a structure is shown in which the buffers I 60 to 63 for absorbing error of rotation synchronization of disks and the buffer II 70 for a defective track are provided separately. Instead, the buffers may be integrated into either one of the buffers I or II. When the buffers I are integrated in the buffers II, the capacity of the buffers II may remain unchanged. However, when the buffers II are to be integrated into the buffers I, the capacity of each of the buffers I needs to be (capacity per one track)×(number of heads for simultaneously recording on and reproducing from per one disk). A total memory capacity may be less when the buffers are integrated into the buffers II. However, integration into the buffers I is recommendable to obtain reliability.

According to the present embodiment, when there exists a defective track in a certain disk, it becomes necessary to make an access to an alternate track, so that it takes time for one recording and reproducing operation. However, alternate tracks are required by the number of only defective tracks, which enables efficient parallel transfer.

It is described that the buffers II are non-volatile memories such as IC memories with battery backup, etc. to secure reliability of data.

In the above embodiment, buffer memories are used as memory means for recording data allocated to defective tracks. As an alternative to, it may also be possible to register the whole track group of each disk as a group of defective tracks and their use prohibited when there is even one defective track among a group; and further a group of alternate tracks which can parallel transfer at one time all the data allocated to the group of defective tracks are designated.

Figure 5:
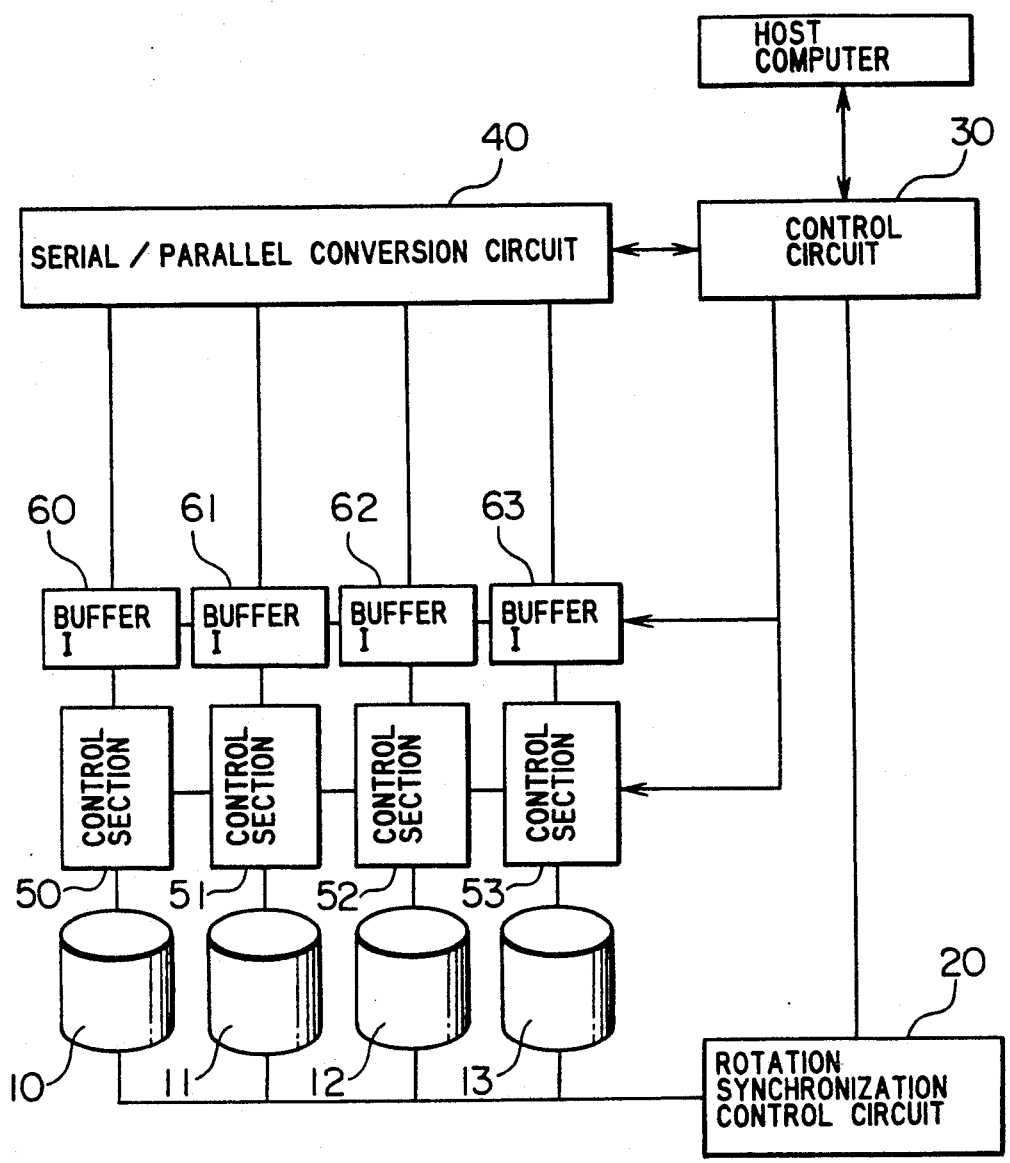
FIG. 5 is a diagram showing an outline configuration of a parallel transfer type disk system as another embodiment of the present invention.

An embodiment of the above will be explained below with reference to FIG. 5. The present embodiment has basically the same structure as that of FIG. 3, but the buffers II are not required. In the present embodiment, the flows of commands and data from the host computer are the same as those in the first embodiment. In the present embodiment, a disk unit has 15 data surfaces, 800 cylinders for recording and reproducing data and 12 alternate cylinders.

Figure 6:
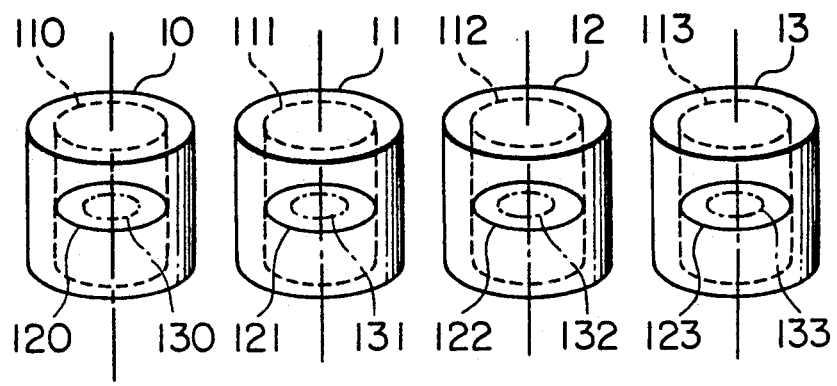
FIG. 6 is a diagram for explaining the relationship between a plurality of cylinders and a plurality of tracks in a magnetic disk of the embodiment shown in FIG. 5.

In FIG. 6, when divided data are to be recorded on the K-th tracks 120 to 123 on the L-th cylinders 110 to 113 of respective disks 10 to 13, the track 122 of a certain disk (for example, the disk 12) is defective and a replacement track has been assigned. In this case, the K-th tracks 120, 121 and 123 of the L-th cylinders 110, 111 and 113 of the remaining disks are regarded as defective tracks and their home addresses are rewritten, the $R_0$ section is rewritten and alternate tracks are assigned. At this time, it is desirable that alternate tracks 130 to 133 are assigned on the same cylinder numbers for each disk. However, if the difference of access times among the disks does not affect the time for starting recording and reproduction, some positional difference causes no problem when the cylinders are located at relatively close positions.

It is desirable that the replacement tracks are assigned at the time of shipment from the plant after respective unit disks 10 to 13 have been inspected and parallel transfer disks have been assembled. Instead, the replacement tracks may be assigned automatically by the control circuit 30 when a user uses the system.

By the above arrangement, even if there exist defective tracks in each disks unit, all the disk are accessed to the alternate tracks at once, so that recording and reproducing of parallel transfer type after completion of the access becomes possible.

A maximum number of alternate tracks (number of alternate cylinders) for a disk unit to be used in the present embodiment may be (number of alternate tracks when disk unit is used as a single unit)×(number of disk units for parallel transfer). In the above embodiment, alternate tracks for three tracks are prepared in a disk unit single unit, so that twelve alternate tracks (replacement cylinders) are prepared in this system.

It is clear that parallel transfer can be achieved in the exactly the same manner even if each disk unit uses a plurality of heads to carry out simultaneous recording and reproducing.

Next, description will be made of an embodiment in which a high-speed parallel transfer is possible even if there is a defective track in each disk unit.

An alternate track is provided within the same cylinder which can carry out recording and reproducing by merely changing a head without operating a head transfer mechanism within each disk unit. When there exists a defective track in a group of tracks for parallel transfer in each disk unit, the home address section $R_0$ of the track is reproduced and an alternate track is recognized. Since the alternate track exists within the same cylinder, the head on the defective track is separated from a recording and reproducing circuit by a head selection switch, and the head on the alternate track is connected with the recording and reproducing circuit instead. By making the reconnection as described above, even if a track within a certain disk unit becomes defective, a parallel transfer by using the alternate track becomes possible without operating the head transfer mechanism.

A detailed description will be made below with reference to FIG. 7. In the present embodiment, four disk units are used, with a capacity of 47.5K bytes per one track, 885 tracks per surface, and eight data surfaces, and heads 411 to 418 are used for recording and reproducing. A head 419 is a servo head. The servo head 419 forms a positioning system, together with a positional error detecting circuit 420, a positioning control circuit 430, a voice coil motor 440 and a carriage 450. The data heads, 417 and 418 designate heads for alternate tracks to be used in the present invention.

Operation of each section in the present embodiment will be explained below. Recording data and commands sent from the host computer (not shown) in the same manner as that of the preceding embodiment are decoded by the control circuit 30, and the disks 10 to 13 are accessed by the control sections 50 to 53 to be positioned at target tracks. The header sections of the target tracks are reproduced to detect whether there exists a defective track among the tracks of each unit. If there is a defective track, a recordable and reproducable track is assigned as an alternate track on the same cylinder. For example, if the track for recording and reproducing with the head 412 in the disk 10 is defective, a recordable and reproducable track with the head 417 or 418 is allocated as an alternate track on the same cylinder. Therefore, the head 412 is separated by the head selection switch 460 and the head 417 is connected with the recording and reproducing circuit 470. The head is electrically replaced with normal speed of a few $\mu$sec. or below. When the head of each disk unit has reached a position on the target track, data to be recorded is sent from the host computer, then divided into four by the serial/parallel conversion circuit 40, and recorded in each respective disk unit.

At the time of reproduction, when a accessed track is defective, the head is immediately replaced and an alternate track is reproduced. The data together with reproduced data from other disks are converted into serial data and are sent to the host computer.

As described above, in the present embodiment, it is necessary to provide alternate tracks. However, parallel transfer between the units can be made by a mere electrical replacement of heads so that a best response can be realized.

In the above embodiment, description has been made of the case where one head is used in each unit. It is clear that this can also be effectively applied to the case where a plurality of heads are simultaneously used for recording and reproducing.

In the above three embodiments, a magnetic disk unit has been taken as an example. However, it is clear that the present invention can also be applied to optical disks, opto-magnetic disks, floppy disk units, etc. Further, since the present invention has a main object of providing a plurality of driving units for driving (transferring) heads, there are two cases, that is, the case where a plurality of head disk assemblies having one driving unit each are provided and the case where a plurality of driving units are provided in one or a plurality of head disk assemblies.

According to the present invention, parallel transfer of data among different driving units becomes possible by one data transfer operation from the host computer so that the computer system can be efficiently operated. Further, an access to an alternate track for a defective track can be facilitated at the time of parallel transfer, so that disks having many defective tracks of relatively low quality can also be used, with economic effect.

We claim:

1. A parallel transfer type disk system, comprising:
   means for inputting digital data;
   means for parallel dividing said data to provide divided data;
   a plurality of heads for allocating said divided data to respective tracks on a plurality of recording media and for simultaneously recording said data on the respective tracks;
   a plurality of driving units for independently moving at least one of said heads on said recording media;
   means for detecting defective tracks among said plurality of tracks on said plurality of recording media;
   memory means for storing data allocated to a defective track when there is a defective track among a group of tracks for recording said parallel divided data;
   means for storing data allocated to said defective track in said memory means at the same time as the recording of data to tracks other than said defective track; and
   reproducing means for reproducing said divided data from said recording media, including reading out data from at least one track of said recording media simultaneously with data stored in said memory means.

2. A parallel transfer type disk system according to claim 1, characterized in that data allocated to said defective track and stored in said memory means is recorded on a replacement track separately provided in a surface direction of said recording media.

3. A parallel transfer type disk system according to claim 1, characterized in that: a buffer memory is used as said memory means to record data allocated to said defective track in said buffer memory, and at the same time, data allocated to tracks other than said defective track is recorded on tracks other than said defective track; said head is positioned at an alternate track separately provided in a surface direction of said recording media by said driving unit; and data recorded on said buffer memory is recorded on said alternate track.

4. A parallel transfer type disk system according to claim 2, characterized in that: a buffer memory is used as said memory means to record data allocated to said defective track in said buffer memory, and at the same time, data allocated to tracks other than said defective track is recorded on tracks other than said defective track; said head is positioned at an alternate track separately provided in a surface direction of said recording media by said driving unit; and data recorded on said buffer memory is recorded on said alternate track.

5. A parallel transfer type disk system according to claim 1, characterized in that data allocated to said defective track and data allocated to tracks other than said defective track are simultaneously recorded on an alternate track recordable on said plurality of recording media.

6. A parallel transfer type disk system according to claim 2, characterized in that data allocated to said defective track and data allocated to tracks other than said defective track are simultaneously recorded on an alternate track recordable on said plurality of recording media.

7. A parallel transfer type disk system according to claim 1, characterized in that: said memory means is an alternate track separately provided in a surface direction of said recording media; and data allocated to said defective track is recorded on said alternate track, and at the same time, data allocated to tracks other than said defective track is recorded on tracks other than said defective track among a plurality of tracks for performing said recording.

8. A parallel transfer type disk system, comprising:
   means for inputting digital data;
   means for parallel dividing said digital data to provide divided data;
   a plurality of heads for simultaneously recording said divided data on respective tracks on respective recording media;
   a plurality of driving units for independently moving at least one of said heads on said recording media;
   means for detecting defective tracks among said plurality of tracks on said recording media;
   memory means for temporarily storing data allocated to a defective track when there exists a defective track among a group of tracks for recording said divided data;
   memory means for storing data allocated to a defective track in said memory means at the same time data is recorded on tracks other than said defective track;
   means for transferring data stored in said memory means to at least one of said plurality of heads for recording the data on an alternate track on said recording media; and
   reproducing means for reproducing said divided data recorded on said recording media, including temporarily storing data recorded on tracks other than said defective track in said memory means and then simultaneously reading out the data in said memory means with data recorded on said alternate track.

9. A parallel transfer type disk system, comprising:
a plurality of disk shaped recording media;
a plurality of heads provided on said plurality of disk shaped recording media for recording and reproducing data;
a plurality of driving units for moving said head;
means for parallel dividing information transferred from the outside;
means for simultaneously recording said divided information to be stored on said disk shaped recording media with at least two heads of said plurality of heads;
means for recording data on only good tracks on said recording media when there exists at least one defective track among a group of tracks on which said parallel divided data to be recorded on said recording media with said at least two heads is to be recorded;
means for temporarily storing data to be recorded in said defective track in a buffer memory;
means for moving said head to an alternate track, after completing recording on said good tracks, to read data to be recorded on said defective track from said buffer memory and to record it on said alternate track;
means for reproducing data from said good tracks and storing it in said buffer memory; and
means for reproducing data by combining data reproduced from said alternate track and data on said good tracks stored in said buffer memory.

10. A parallel transfer type disk system according to claim 9, characterized in that said buffer memory is a non-volatile memory or there is provided a means for making said buffer memory non-volatile.

11. A parallel transfer type disk system comprising:
means for inputting digital data;
means for parallel dividing said digital data;
a plurality of magnetic disks for recording each of said divided digital data, said magnetic disks including a plurality of magnetic heads for allocating said divided digital data to respective tracks on a plurality of magnetic recording disks for simultaneous recording of the data, and a magnetic head driving means including a head selection means for driving said magnetic heads;
means for detecting a defective track among said plurality of tracks from track signals;
memory means for temporarily recording digital data allocated to a defective track when existence of said defective track has been detected by said detecting means among a group of tracks on which said parallel divided digital data are to be recorded;
means for recording temporarily recorded digital data allocated to said defective track, on a predetermined alternate track after digital data allocated to tracks other than said defective track has been recorded on predetermined tracks; and
reproducing means for reproducing said divided digital data from said magnetic disk, including temporarily storing data recorded on tracks other than said defective track in said memory means and then simultaneously reading out the data in said memory means with data recorded on said predetermined alternate track.

12. A parallel transfer type disk system according to claim 11, wherein said memory means is a buffer memory.

13. A parallel transfer type disk system according to claim 11, wherein said memory means is a track on said magnetic disk.

14. A parallel transfer type disk system according to claim 11, wherein said driving means in said magnetic disk includes a positional error detecting circuit, a positioning control circuit, a voice coil motor and a recording and reproducing circuit.

* * * * *